United States Patent
Sugata et al.

(10) Patent No.: US 9,881,246 B2
(45) Date of Patent: Jan. 30, 2018

(54) SEMICONDUCTOR DEVICE INCLUDING A RECTIFICATION CIRCUIT

(71) Applicant: FUJITSU SEMICONDUCTOR LIMITED, Yokohama-shi, Kanagawa (JP)

(72) Inventors: Akihiko Sugata, Tachikawa (JP); Kohji Nozoe, Yokohama (JP); Tsuzumi Ninomiya, Hachiouji (JP); Shinya Fujioka, Kawasaki (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 21 days.

(21) Appl. No.: 14/811,230

(22) Filed: Jul. 28, 2015

(65) Prior Publication Data
US 2016/0055406 A1    Feb. 25, 2016

(30) Foreign Application Priority Data
Aug. 25, 2014 (JP) .................................. 2014-170602

(51) Int. Cl.
G06K 19/07 (2006.01)
G06K 7/10 (2006.01)
G06K 19/073 (2006.01)
G06K 19/077 (2006.01)

(52) U.S. Cl.
CPC ..... G06K 19/0709 (2013.01); G06K 7/10316 (2013.01); G06K 19/073 (2013.01); G06K 19/07754 (2013.01)

(58) Field of Classification Search
None
See application file for complete search history.

(56) References Cited

FOREIGN PATENT DOCUMENTS

| JP | 2001-516460 A | 9/2001 |
| JP | 2008-236961 A | 10/2008 |
| WO | WO 99/37039 A2 | 7/1999 |

OTHER PUBLICATIONS

Chinese Office Action of related Chinese Patent Application No. 201510511697.3 dated Jun. 26, 2017.

*Primary Examiner* — Daniell L Negron
(74) *Attorney, Agent, or Firm* — Arent Fox LLP

(57) ABSTRACT

In a semiconductor device that generates a power supply voltage from an RF carrier signal received by an antenna through the use of a rectification circuit, rectification circuits, each including a plurality of capacitors and a plurality of diodes, are connected in multistage. The rectification circuits includes limiter circuits that are turned on at a voltage larger than an on-voltage of the diodes, clamp cathodes of the diodes at a first voltage. The limiter circuits and the diodes are connected in parallel between the capacitors connected to the antenna connection terminal and a node supplied reference potential VSS of the power supply voltage.

6 Claims, 6 Drawing Sheets

F I G. 2
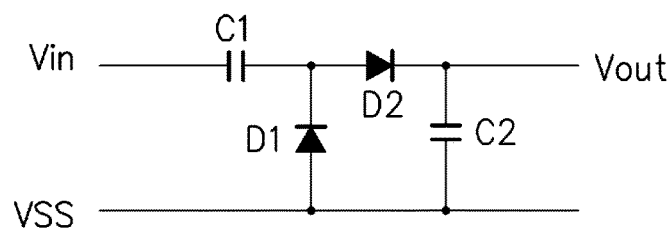
F I G. 3
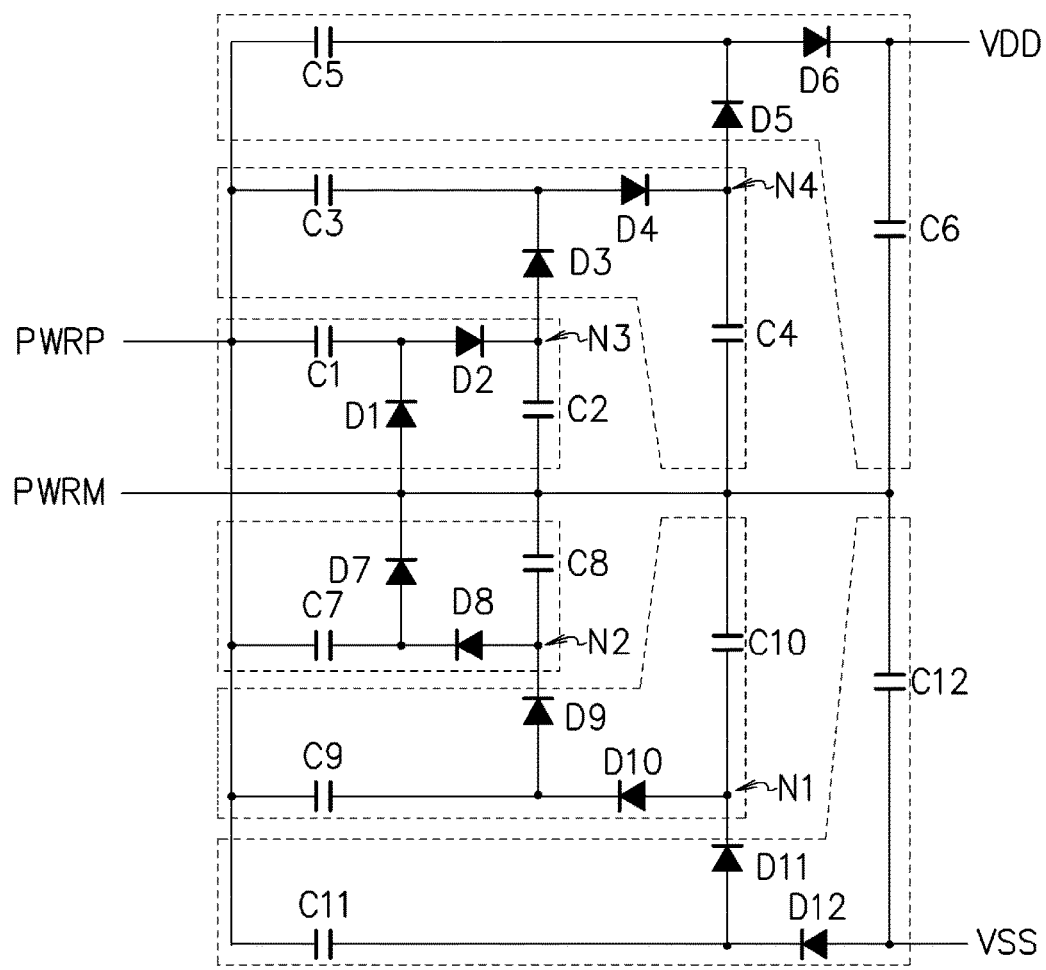

F I G. 9
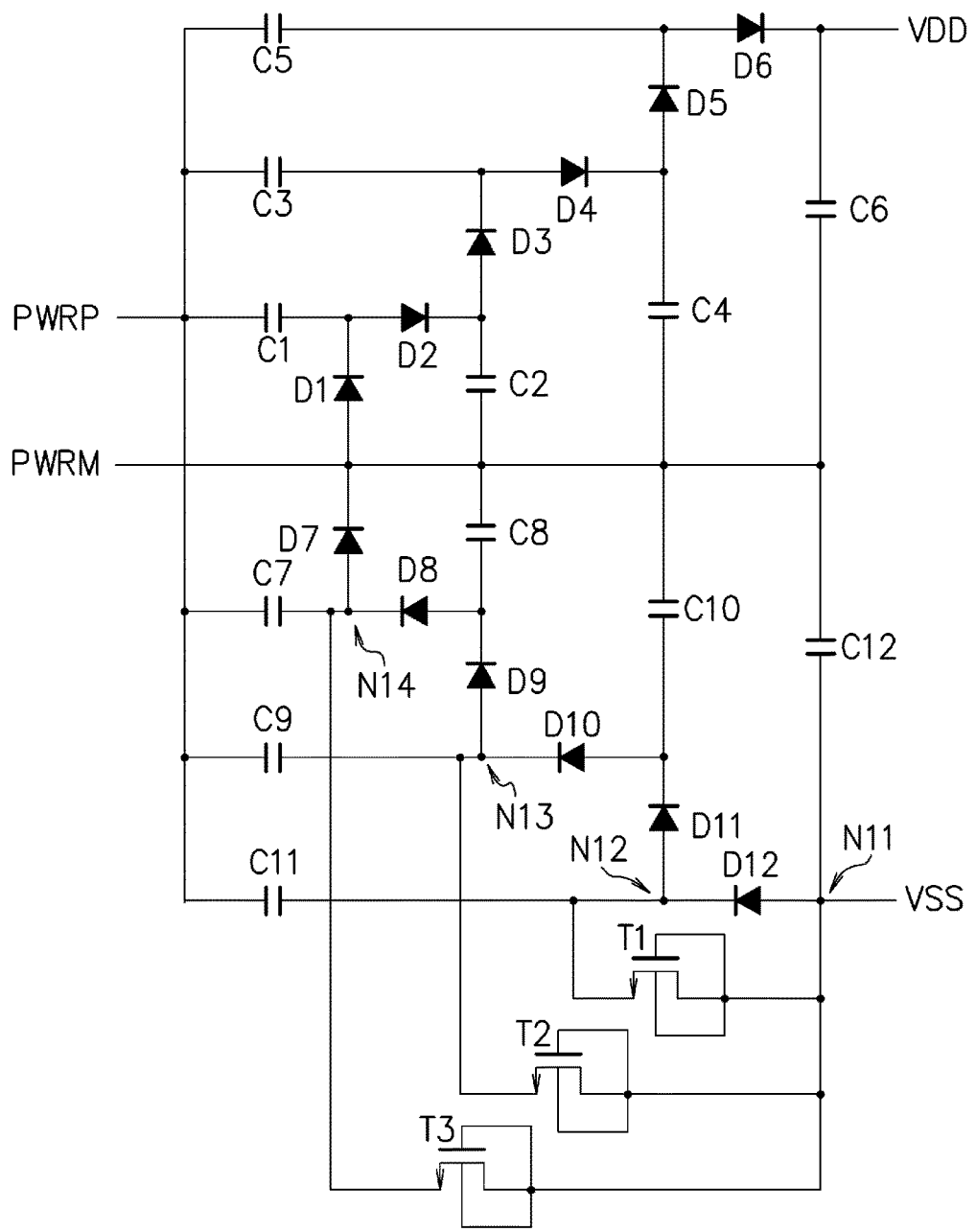

F I G. 10
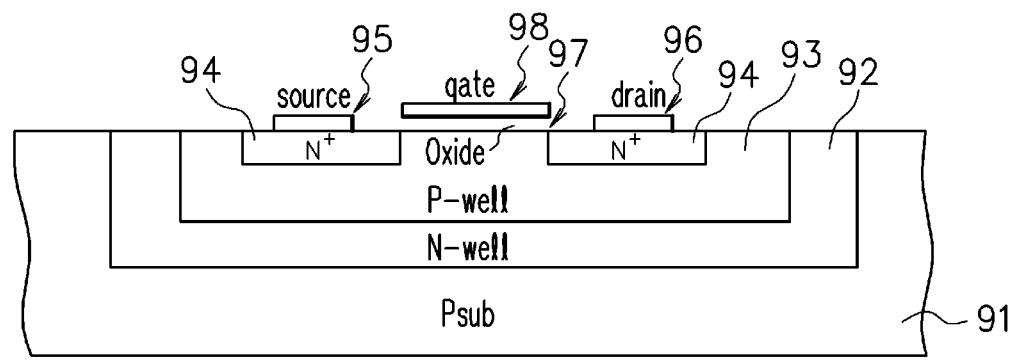
F I G. 11
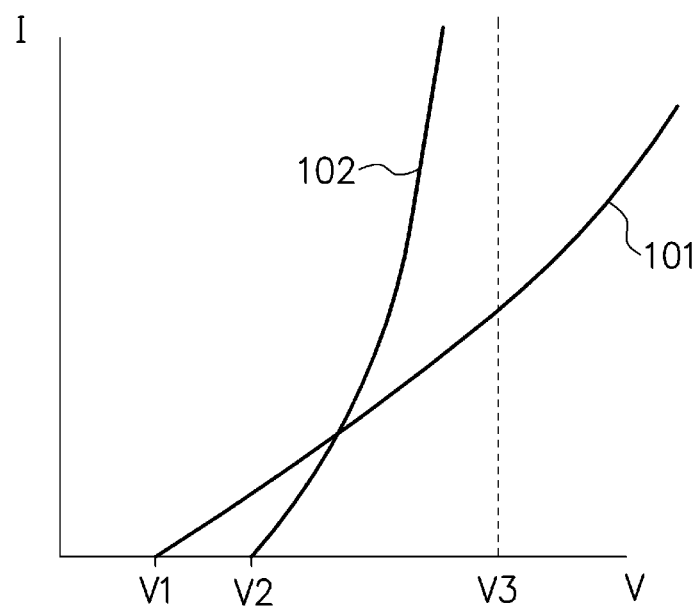

SEMICONDUCTOR DEVICE INCLUDING A RECTIFICATION CIRCUIT

CROSS-REFERENCE TO RELATED APPLICATION

This application is based upon and claims the benefit of priority of the prior Japanese Patent Application No. 2014-170602, filed on Aug. 25, 2014, the entire contents of which are incorporated herein by reference.

FIELD

The embodiments discussed herein are directed to a semiconductor device.

BACKGROUND

In recent years, automatic recognition, information management, and traceability management using radio frequency identification (RFID) have been spread. RFID systems are used in various industrial fields because data is writable, large amount of information can be processed, and long distance communication is allowed. Frequencies used in RFID systems include HF band (mainly 13.56 MHz) and UHF band (860 MHz to 960 MHz). RFID systems using UHF band are becoming smaller component and can be used for longer distance communication because the used frequency is high (wavelength is short).

An RFID system includes a reader/writer (R/W) and an RFID tag, each including an antenna. The reader/writer modulates radio frequency (RF) carrier signals corresponding a command and transmits the modulated RF carrier signals. The RFID tag receives signals from the reader/writer and generates a DC power from an RF carrier signal. The RFID tag then drives a circuit by the generated DC power, interprets the received command, and performs a process corresponding to the command. When the command requests a response, the RFID tag generates binary data by reflecting or absorbing the received RF carrier signal by the modulation circuit based on the data generated within the RFID tag and responses with the generated binary data.

In a typical RFID system, the distance between a reader/writer and an RFID tag is not defined, and an RFID system is used at various distances depending on customers' use. Thus, one of requirements for an RFID tag is that stable communication is possible regardless the distance between a reader/writer and the RFID tag, in other words, the dynamic range thereof is wide. Therefore, an RFID tag is typically designed such that the RFID tag can be operated in communication at a long distance. For an RFID tag, thus, a circuit is designed such that receive and response operation is possible with a small power, and the circuit can be operated even with small input amplitude.

In some cases, when an RFID tag is close to a reader/writer, maximum transmission power in conformance with a regulation and the like at place of use may be input to an antenna of the RFID tag. Setting the transmission power of a reader/writer to a certain value varies the reception power of an RFID tag inverse-proportionally with the square of the distance between the reader/writer and the RFID tag. This makes the reception power of an RFID tag that is designed to be operable with a small power very large when the RFID tag is close to a reader/writer. Thus, reception performance of large signals may be unstable or large signal reception may be difficult, disabling communication in wide dynamic range.

In a semiconductor integrated circuit device that is used in an RFID tag and generates a DC power from radio waves received by an antenna, there is proposed a technique to limit output voltage not to increase beyond a certain voltage by providing a voltage limit circuit causing current to flow toward the reference potential when the output voltage output from the output terminal increases beyond the certain voltage (refer to Patent Document 1, for example). In addition, in a device for converting magnetic energy to rectified electrical energy, there is proposed a technique to discharge surplus energy charged in a magnetic field converter circuit through the use of a discharge-promoting circuit (refer to Patent Document 2, for example).

[Patent Document 1] Japanese Laid-open Patent Publication No. 2008-236961
[Patent Document 2] Japanese National Publication of International Patent Application No. 2001-516460

SUMMARY

One aspect of a semiconductor device includes: an antenna that transmits and receives a wireless signal; and a rectification circuit that includes unit rectification circuits connected in multistage and generates a power supply voltage from the wireless signal received by the antenna, each unit rectification circuit includes a plurality of capacitors and a plurality of diodes. The rectification circuit includes limiter circuits that are turned on at a voltage larger than an on-voltage of the diodes, clamp cathodes of the diodes at a first voltage. Between the capacitors connected to the antenna connection terminal and a node supplied a reference potential of the power supply voltage, the diodes and the limiter circuits are connected in parallel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting a configuration example of a rectification circuit;

FIG. 3 is a diagram depicting a configuration example of a rectification circuit by using unit rectification circuits connected in multistage;

FIG. 9 is a diagram depicting a configuration example of the rectification circuit in the present embodiment;

FIG. 10 is a sectional view depicting a configuration of a MOS transistor as a limiter circuit in the present embodiment; and FIG. 11 is a view for describing characteristics of the diodes and the limiter circuits in the rectification circuit in the present embodiment.

DESCRIPTION OF EMBODIMENTS

Hereinafter, embodiments will be described based on the drawings.

Figure 1:
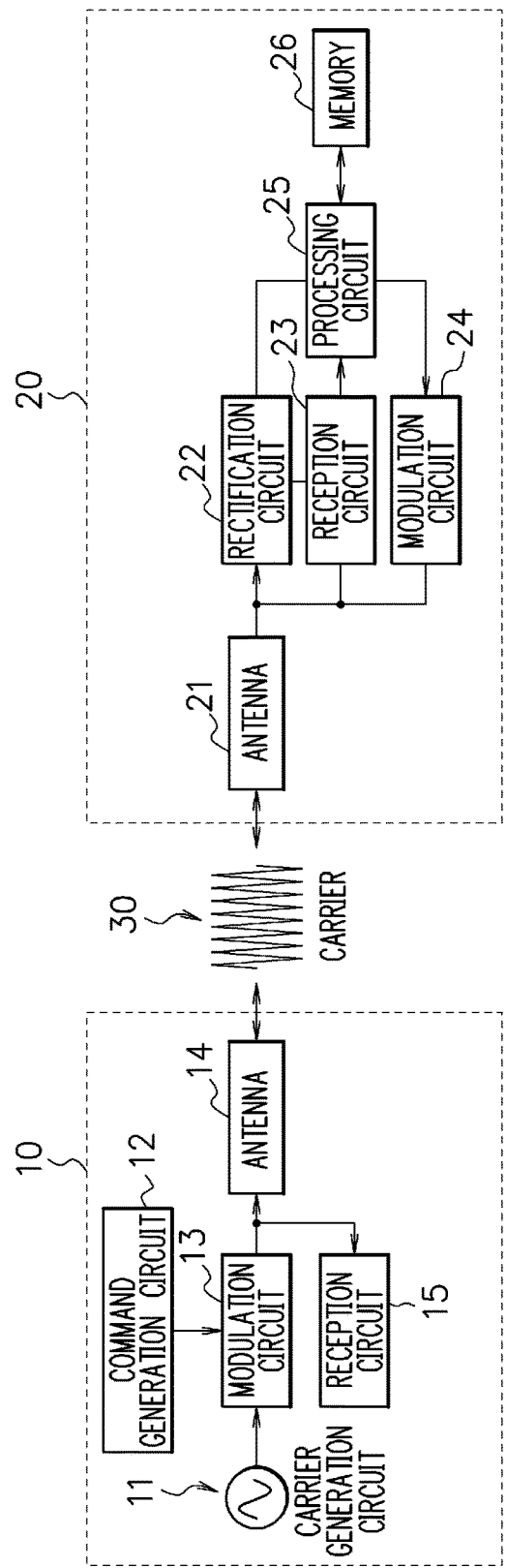
FIG. 1 is a diagram depicting a configuration example of an RFID system in a present embodiment.

FIG. 1 is a diagram depicting a configuration example of an RFID system in a present embodiment. The RFID system in the present embodiment includes a reader/writer 10 and an RFID tag 20 as a semiconductor device in the present embodiment. The reader/writer 10 and the RFID tag 20 wirelessly communicate with each other by transmitting and receiving radio frequency (RF) carrier signals (wireless signals) 30.

The reader/writer 10 includes a carrier generation circuit 11, a command generation circuit 12, a modulation circuit 13, an antenna 14, and a reception circuit 15. For example, the carrier generation circuit 11 is an oscillator. The carrier generation circuit 11 generates RF carrier signals. The command generation circuit 12 generates command signals each containing a command or data to be transmitted to the RFID tag 20 side. The command may be a command for reading information (e.g. ID) written in an RFID tag and a command for writing data in a specified address area in an RFID tag, for example.

The modulation circuit 13 modulates RF carrier signals generated by the carrier generation circuit 11 corresponding to a command signal from the command generation circuit 12. The modulation system is amplitude shift keying (ASK) modulation indicating data "1" when a carrier is present and data "0" when a carrier is not present, for example. The antenna 14 transmits and receives RF carrier signals. The antenna 14 transmits RF carrier signals modulated by the modulation circuit 13, and receives RF carrier signals from the RFID tag 20 and supplies the carrier signals to the reception circuit 15.

The reception circuit 15 receives response signals from the RFID tag 20 via the antenna 14. The reception circuit 15 decodes received signals and performs a process corresponding to response data. Because direct input of RF carrier signals from the modulation circuit 13 to the reception circuit 15 disturbs response signals from the RFID tag 20, a circulator, which is not depicted, etc. is inserted between the modulation circuit 13 and the reception circuit 15 and between the modulation circuit 13 and the antenna 14, for example, to prevent leakage of signals.

The RFID tag 20 includes an antenna 21, a rectification circuit 22, a reception circuit 23, a modulation circuit 24, a processing circuit 25, and a memory 26. The antenna 21 transmits and receives RF carrier signals. Modulated RF carrier signals (carrier signals modulated corresponding to commands) received from the reader/writer 10 by the antenna 21 are incident to the rectification circuit 22, the reception circuit 23, and the modulation circuit 24. The rectification circuit 22 rectifies RF carrier signals received by the antenna 21 to generate power supply voltage (DC voltage). Each of the circuits included in the RFID tag 20 is driven by the power supply voltage (DC voltage) generated by the rectification circuit 22.

The reception circuit 23 extracts a command from a modulated RF carrier signal received by the antenna 21. A carrier signal in UHF band, for example, has a frequency of 860 MHz to 960 MHz and a command bit rate of 40 Kb/s to 160 Kb/s. Thus, the command can be extracted from a signal received by a low pass filter having a low-pass frequency band of about 200 KHz.

The processing circuit 25 recognizes received commands at self-timing, and performs processes corresponding to the commands. The length of data "0", the length of data "0" and data "1", and the like precede a command as a header and are transmitted from the reader/writer 10. Thus, The processing circuit 25 performs the process based on the lengths. The memory 26 is a readable and writable nonvolatile memory and retains information (ID, production serial number, individual data, etc.) of the RFID tag 20. For example, the processing circuit 25 reads and writes information by accessing to the memory 26 based on content of a command from the reader/writer 10 that the processing circuit 25 has recognized.

The modulation circuit 24 responses to the reader/writer 10 based on the result of the process performed by the processing circuit 25 corresponding to a command. The modulation circuit 24 generates a binary signal consisting of "0" and "1" by absorbing or reflecting (impedance modulation) an incident RF carrier signal unlike the modulation circuit 13 of the reader/writer 10. For example, a transistor may be provided between the antenna 21 and a node supplied the reference potential, and the modulation circuit 24 controls reflection amount through on-off control of the transistor.

FIG. 2 is a diagram depicting a configuration example of a rectification circuit (multiplied voltage rectification circuit). A capacitor C1 has one electrode connected to an input terminal receiving an input voltage Vin and the other electrode connected to a cathode of a diode D1. An anode of the diode D1 is connected to the reference potential line having a reference potential VSS. A capacitor C2 has one electrode connected to the reference potential line and the other electrode connected to a cathode of a diode D2 and an output terminal supplying an output voltage Vout. An anode of the diode D2 is connected to an interconnection point between the other electrode of the capacitor C1 and the cathode of the diode D1.

Rectifying operation of the rectification circuit depicted in FIG. 2 will be described. It is assumed hereinafter that the input terminal receives sine wave signal having amplitude of the potentials ±Vin with respect to the reference potential VSS, and the on-voltages of the diodes D1 and D2 are both Von. When the potential of the input terminal is lower than the reference potential VSS and the difference between the potential of the input terminal and the reference potential VSS is lower than the on-voltage Von of the diodes, current flows from the reference potential line to the input terminal through the diode D1 and the capacitor C1 to charge the capacitor C1. When the potential of the input terminal is higher than the reference potential VSS and the difference between the potential of the input terminal and the reference potential VSS is higher than the on-voltage Von of the diodes, current flows from the input terminal to the reference potential line through the capacitor C1, the diode D2, and the capacitor C2. At this time, the potential of the capacitor C1 charged in the previous step is added to the potential of the input terminal, and to the resultant potential, the capacitor C2 is charged. These steps are repeated so that the rectification circuit depicted in FIG. 2 generates voltage {2×(Vin−Von)} as the output voltage Vout.

The output voltage Vout of the rectification circuit (multiplied voltage rectification circuit) having the configuration depicted in FIG. 2 can be expressed as Vout=N×(Vin−Von) using the input voltage Vin and the on-voltage Von of the diodes. In the expression, N is the number of diodes. The on-voltage Von of the diode may be 0.7 V for Si diode and 0.2 to 0.3 V for schottky barrier diode (SBD), for example.

In the rectification circuit having the configuration depicted in FIG. 2, circuits depicted in FIG. 2 may be stacked (in multistage connection) to increase the number of diodes or the on-voltage Von of the diodes may be lowered in order to increase the output voltage Vout. FIG. 3 is a diagram depicting a configuration example of a rectification circuit having twelve diodes by stacking (in multistage connection) rectification circuits having the circuit configuration depicted in FIG. 2 as an example. FIG. 3 depicts an example where the configuration is applied to the rectification circuit 22 of the RFID tag 20.

As surrounded by broken lines in FIG. 3, a set of capacitors C1 and C2 and diodes D1 and D2, a set of capacitors C3 and C4 and diodes D3 and D4, a set of capacitors C5 and C6 and diodes D5 and D6, a set of capacitors C7 and C8 and diodes D7 and D8, a set of capacitors C9 and C10 and diodes D9 and D10, and a set of capacitors C11 and C12 and diodes D11 and D12 each realize a rectification circuit (multiplied voltage rectification circuit) similar to that depicted in FIG. 2.

An output node of the rectification circuit in the previous stage is connected to the rectification circuit of the next stage to supply an output voltage of the rectification circuit of the previous stage to the rectification circuit of the next stage. Specifically, an output node N3 of a first rectification circuit including the capacitors C1 and C2 and the diodes D1 and D2 is connected to a second rectification circuit including the capacitors C3 and C4 and the diodes D3 and D4. An output node N4 of the second rectification circuit is connected to a third rectification circuit including the capacitors C5 and C6 and the diodes D5 and D6. A potential of an output node of the third rectification circuit is output as a first output potential (a high potential of the generated power supply voltage) VDD.

In addition, an output node N2 of a fourth rectification circuit including the capacitors C7 and C8 and the diodes D7 and D8 is connected to a fifth rectification circuit including the capacitors C9 and C10 and diodes D9 and D10. An output node N1 of the fifth rectification circuit is connected to a sixth rectification circuit including the capacitors C11 and C12 and the diodes D11 and D12. A potential of an output node of the sixth rectification circuit is output as a second output potential (a reference potential of the generated power supply voltage) VSS. In this embodiment, the output potential VSS is a substrate potential of a semiconductor integrated circuit (LSI), on which respective circuits in the RFID tag 20 are formed, and the output voltage VDD, when the output potential VSS is the reference potential, is supplied to the respective circuits in the RFID tag 20.

Figure 4:
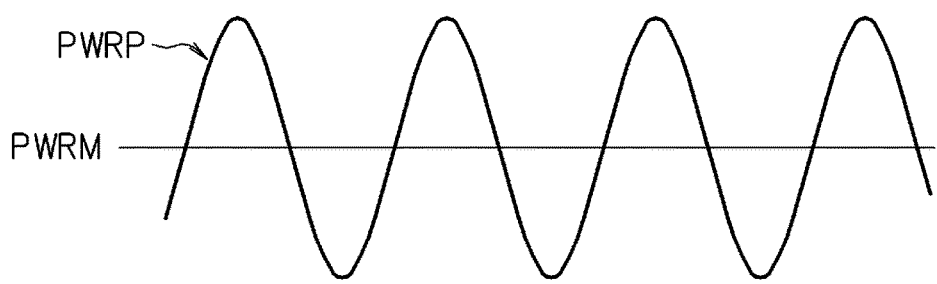
FIG. 4 is a diagram depicting an example of a received radio wave.
Figure 5:
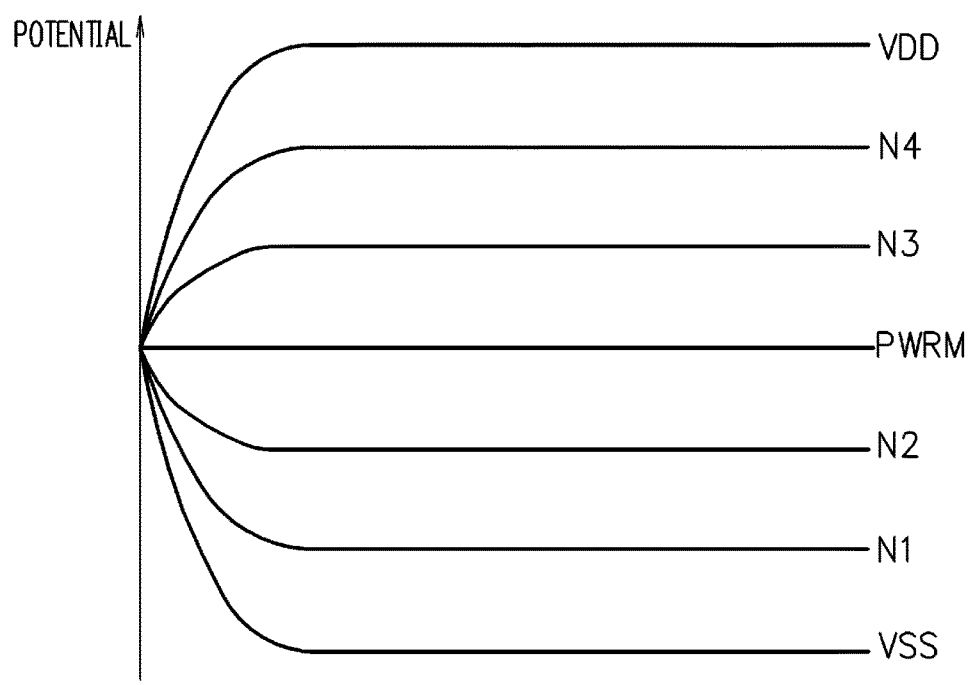
FIG. 5 is a diagram depicting change over time of potentials of respective nodes in the rectification circuit depicted in FIG. 3.

In FIG. 3, antenna connection terminals PWRP and PWRM are depicted. The antenna 21 is connected between the antenna connection terminals PWRP and PWRM. To the antenna 21, an RF carrier signal of a sine wave having amplitude of a certain potential with respect to a potential of the terminal PWRM as depicted in FIG. 4 is input. FIG. 5 is a diagram depicting change over time of potentials of respective nodes when the signal depicted in FIG. 4 is applied between the terminals PWRP and PWRM. FIG. 5 depicts the potentials of respective nodes N1 to N4, VDD, and VSS with respect to the potential of the terminal PWRM as a reference. In this embodiment, the RF carrier signal input between the terminals PWRP and PWRM is an RF carrier signal having been ASK-modulated by the reader/writer 10 though the RF carrier signal is not depicted in FIG. 4.

Figure 6:
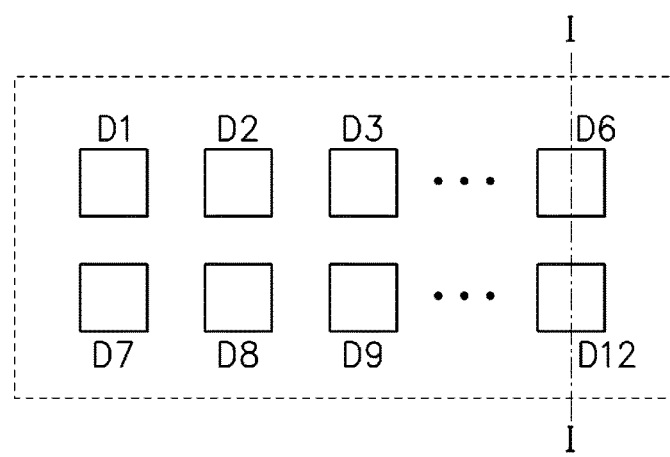
FIG. 6 is a diagram depicting a layout example of diodes in the rectification circuits depicted in FIG. 3.
Figure 7:
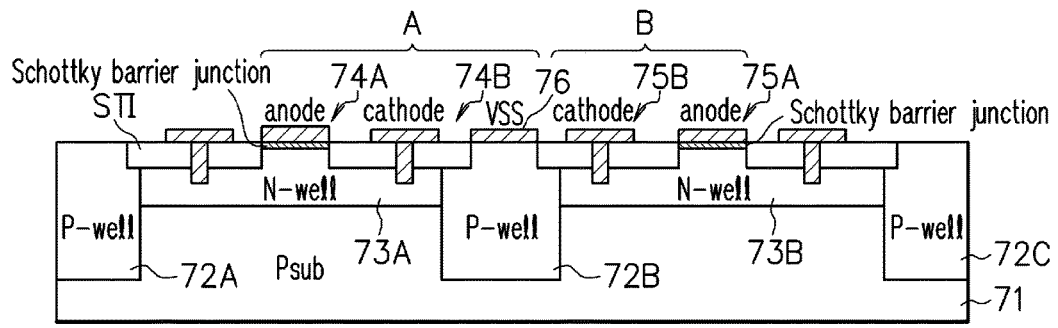
FIG. 7 is a sectional view taken along the line I-I in FIG. 6.

FIG. 6 is a diagram depicting a layout example of the diodes in the rectification circuit depicted in FIG. 3. Such linearly positioning of the diodes D1 to D12 of the rectification circuit of FIG. 3 in the layout of FIG. 6 enables the rectification circuit to have a small circuit area. FIG. 7 is a sectional view taken along the line I-I in FIG. 6. In FIG. 7, a portion A includes the diode D12 and VSS, and a portion B includes the diode D6. P-type wells 72A, 72B, and 72C and N-type wells 73A and 73B are formed in a P-type substrate 71. In addition, Shallow Trench Isolation STI is depicted.

As depicted in FIG. 7, a cathode electrode 74B of the diode D12 connected to the antenna connection terminal PWRP through the capacitor C11 is connected to the N-type well 73A through a contact. A schottky barrier junction is formed between an anode electrode 74A of the diode D12 and the N-type well 73A. A cathode electrode 75B of the diode D6 connected to the output terminal having the output potential VDD is connected to the N-type well 73B through a contact. A schottky barrier junction is formed between an anode electrode 75A of the diode D6 and the N-type well 73B. The P-type well 72B is brought to the potential VSS through wiring 76 and the like. In the configuration depicted in FIG. 7, there is present a parasitic NPN bipolar transistor constituted of the N-type well 73B included in the diode D6 (the portion B), the P-type well 72B brought to the potential VSS, and the N-type well 73A included in the diode D12 (the portion A).

In this embodiment, an antenna connection terminal is connected to a diode through a capacitor according to the configuration of a rectification circuit (multiplied voltage rectification circuit). In the example depicted in FIG. 3, the antenna connection terminal PWRP is connected, for example, to a cathode of the diode D1 through the capacitor C1, a cathode of the diode D3 through a capacitor C3, a cathode of the diode D5 through a capacitor C5, a cathode of the diode D8 through a capacitor C7, a cathode of the diode D10 through a capacitor C9, and a cathode of the diode D12 through a capacitor C11. Thus, increase of amplitude of a carrier signal received by the antenna upon short distance reception increases the peak voltage in positive direction and negative direction with respect to the DC potentials of the cathodes of the diodes.

When the potential of the cathode electrode 74B of the diode D12 connected to the antenna connection terminal PWRP through the capacitor C11 changes to the negative side because of large power input through short distance communication or the like, current flows from the P-type well 72B of the potential VSS toward the N-type well 73A as the cathode of the diode D12. The current flowing from the P-type well 72B toward the N-type well 73A corresponds to base current. Current obtained by multiplying the current by the current gain flows from the N-type well 73B as the cathode of the diode D6 toward the N-type well 73A as the cathode of the diode D12. The current flowing from the N-type well 73B toward the N-type well 73A corresponds to collector current.

Thus, the potential of the cathode of the diode D6, in other word, the output potential VDD is lowered, disabling normal power supply to other circuits to prevent stable operation of the circuits, thereby instability or impossibility of communication may be caused. In order to lower the collector current, the distance between circuits may be elongated to add wiring resistance so as to lower the base current. However, this unfortunately increases a circuit area.

Figure 8:
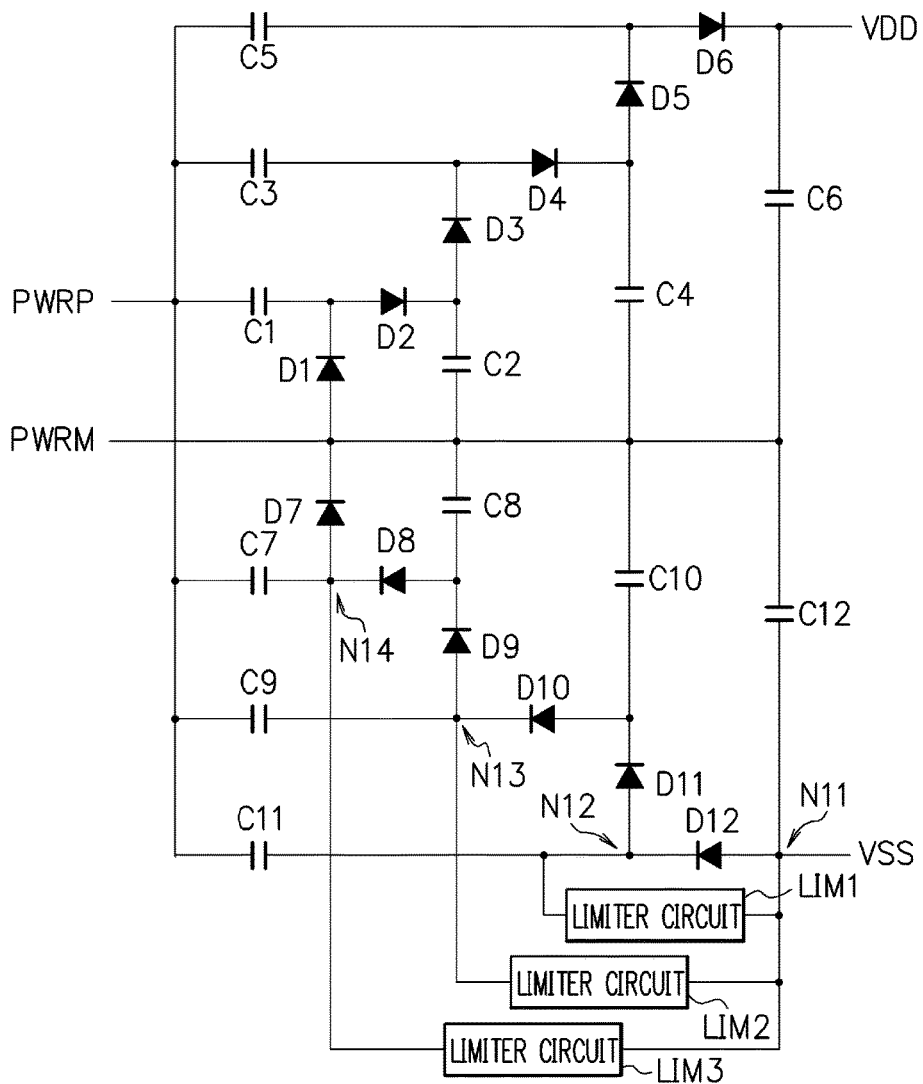
FIG. 8 is a diagram depicting a configuration example of a rectification circuit in the present embodiment.

Thus, in the present embodiment, limiter circuits are provided as depicted in FIG. 8, and node potentials between the capacitors connected to the antenna connection terminal PWRP and the cathodes of the diodes are limited by the limiter circuits so as to suppress change of the node potentials with respect to the potential VSS to the negative side. This suppresses increase of the base current of a parasitic bipolar transistor constituted of the diodes D6 and D12, and suppresses lowering of the output potential VDD.

FIG. 8 is a diagram depicting a configuration example of the rectification circuit (multiplied voltage rectification circuit) in the present embodiment. FIG. 8 depicts an example where the limiter circuits are provided for the rectification circuit having twelve diodes depicted in FIG. 3.

As described above, the set of the capacitors C1 and C2 and the diodes D1 and D2, the set of the capacitors C3 and C4 and the diodes D3 and D4, the set of the capacitors C5 and C6 and the diodes D5 and D6, the set of the capacitors C7 and C8 and the diodes D7 and D8, the set of the capacitors C9 and C10 and the diodes D9 and D10, and the set of the capacitors C11 and C12 and the diodes D11 and D12 each realize a rectification circuit (multiplied voltage rectification circuit) similar to that depicted in FIG. 2.

An output node of the rectification circuit in the previous stage is connected to the rectification circuit of the next stage to supply an output voltage of the rectification circuit of the previous stage to the rectification circuit of the next stage. Specifically, the output node N3 of the first rectification circuit including the capacitors C1 and C2 and the diodes D1 and D2 is connected to the second rectification circuit including the capacitors C3 and C4 and the diodes D3 and D4. The output node N4 of the second rectification circuit is connected to the third rectification circuit including the capacitors C5 and C6 and the diodes D5 and D6. The potential of the output node of the third rectification circuit is output as a first output potential (a high potential of the generated power supply voltage) VDD.

In addition, the output node N2 of the fourth rectification circuit including the capacitors C7 and C8 and the diodes D7 and D8 is connected to the fifth rectification circuit including the capacitors C9 and C10 and diodes D9 and D10. The output node N1 of the fifth rectification circuit is connected to the sixth rectification circuit including the capacitors C11 and C12 and the diodes D11 and D12. The potential of the output node of the sixth rectification circuit is output as the second output potential (the reference potential of the generated power supply voltage) VSS.

Between the capacitor C11 connected to the antenna connection terminal PWRP and a node N11 having the potential VSS, a limiter circuit LIM1 and the diode D12 are connected in parallel. Between the capacitor C9 connected to the antenna connection terminal PWRP and the node N11 having the potential VSS, a limiter circuit LIM2 and the diode D10 are connected in parallel. Between the capacitor C7 connected to the antenna connection terminal PWRP and the node N11 having the potential VSS, a limiter circuit LIM3 and the diode D8 are connected in parallel.

When potentials of nodes N12, N13, and N14 between the capacitors C11, C9, and C7 and the diodes D12, D10, and D8 change to negative potentials with respect to the potential VSS, the limiter circuits LIM1, LIM2, and LIM3 prevent the potentials from being lowered to a potential turning on parasitic bipolar transistors constituted of the corresponding diodes. Specifically, when potentials of the nodes N12, N13, and N14 change to negative potentials with respect to the potential VSS, the limiter circuits LIM1, LIM2, and LIM3 clip the potentials at a certain potential to limit lowering of the potentials such that potential differences between the potentials of the nodes N12, N13, and N14 and the potential VSS do not reach the potential turning on the parasitic bipolar transistors.

The limiter circuits LIM1, LIM2, and LIM3 have circuit characteristic 102 depicted in FIG. 11, for example. According to the circuit characteristic 102, the limiter circuits LIM1, LIM2, and LIM3 are turned on at a voltage V2 equal to or lower than a voltage V3, which turns on the parasitic bipolar transistors, and allow current, which is large enough not to make the potential differences between the potentials of the nodes N12, N13, N14 and the potential VSS reach the voltage V3, to flow. In FIG. 11, circuit characteristic 101 is characteristic of the diodes D1 to D12. As depicted in FIG. 11, the diodes D1 to D12 are turned on at a voltage V1 lower than the voltage V2 turning on the limiter circuits LIM1, LIM2, and LIM3. Thus, highly efficient rectifying characteristic can be realized. Note that, as the diodes D1 to D12 of the rectification circuit, schottky barrier diodes (SBD) having a low on-voltage, for example, may be used to realize highly efficient rectifying characteristic.

FIG. 9 is a diagram depicting a circuit configuration example of a rectification circuit (multiplied voltage rectification circuit) in the present embodiment. FIG. 9 depicts an example, in which the limiter circuits LIM1, LIM2, and LIM3 depicted in FIG. 8 are realized by diode-connected N-channel type MOS transistors T1, T2, and T3.

Between the node N11 having the potential VSS and the cathode of the diode D12 (the node N12), a diode-connected N-channel type MOS transistor T1 as a limiter circuit is connected. Between the node N11 having the potential VSS and the cathode of the diode D10 (node N13), a diode-connected N-channel type MOS transistor T2 as a limiter circuit is connected. Between the node N11 having the potential VSS and the cathode of the diode D8 (node N14), a diode-connected N-channel type MOS transistor T3 as a limiter circuit is connected.

FIG. 10 is a sectional view depicting a configuration example of the N-channel type MOS transistors T1, T2, and T3. On a P-type substrate 91, an N-type well 92 is formed. In the N-type well 92, a P-type well 93 is formed. In the P-type well 93, N+ diffusion layers to be a source region and a drain region are formed. On the N+ diffusion layers, a source electrode 95 and a drain electrode 96 are respectively formed. On a channel region between the source region and the drain region, a gate electrode 98 is formed through a gate insulating film (oxide film) 97.

Setting a threshold voltage of the N-channel type MOS transistors T1, T2, and T3 to Vth, and configuring the N-channel type MOS transistors T1, T2, and T3 as depicted in FIG. 9 can keep the potentials of the nodes N12, N13, N14 higher than (Vss−Vth). Since the diode-connected N-channel type MOS transistors T1, T2, and T3 are used as limiter circuits, a capacity of only one of the source and the drain is applied as a load, which can suppress increase of load capacity caused by providing limiter circuits.

According to the embodiment, between the capacitors, to which the antenna connection terminal PWRP is connected, and the nodes having the potential VSS, diodes as rectifier elements having a low threshold value and limiter circuits that have a high threshold and clamp the potentials are connected in parallel. Thus, when the potentials of the cathodes of the diodes are negative potentials with respect to the potential VSS, the node potentials between capacitors, to which the antenna connection terminal PWRP is connected, and the cathodes of the diodes are limited by a limiter circuit such that the potential differences between the potentials of the cathodes and the potential VSS are equal to or lower than the voltage turning on the parasitic bipolar transistors. Therefore, even when large power is input through short distance communication or the like, changing of the cathode potentials of the diodes to the negative potential side is suppressed, and lowering of the output potential VDD is also suppressed, thereby enabling stable communication even when an RFID tag is at a short distance with respect to the reader/writer. In addition, the use of rectifier elements having a low threshold value can suppress lowering of the rectifying characteristic.

The disclosed semiconductor device can suppress changing of cathode potentials of the diodes of the rectification circuit to the negative potential side even when a wireless signal having large power is input, and suppress lowering of the output voltage, thereby enabling stable communication even when the RFID tag is at a short distance with respect to the reader/writer.

While certain embodiments have been described, these embodiments of the invention have been presented by way of example only, and the scope of the technical scope of the inventions should not be restrictively interpreted based on the embodiments. Specifically, the invention herein may be embodied in a variety of forms without departing from the technical spirit and essential characteristic thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
    an antenna that transmits and receives a wireless signal; and
    a rectification circuit that includes a plurality of unit rectification circuits connected in a multistage and generates a power supply voltage from the wireless signal received by the antenna connected to the rectification circuit through an antenna connection terminal, each unit rectification circuit includes a plurality of capacitors and a plurality of diodes,
    wherein:
    the rectification circuit further includes a plurality of limiter circuits, the limiter circuits are turned on at a voltage larger than an on-voltage of first diodes of the rectification circuit and clamp cathodes of the first diodes at a first voltage, and the first voltage is smaller than a threshold voltage of a parasitic bipolar transistor that includes the first diodes of the rectification circuit; and
    the limiter circuits and the first diodes are connected in parallel between one electrode of first capacitors of the rectification circuit and an output node outputting a reference potential of the power supply voltage, another electrode of the first capacitors is connected to the antenna connection terminal.

2. The semiconductor device according to claim 1, wherein the limiter circuits are diode-connected MOS transistors connected between the one electrode of the first capacitors and the output node.

3. The semiconductor device according to claim 2, further comprising:
    a reception circuit that extracts a command from the wireless signal received by the antenna;
    a processing circuit that performs a process corresponding to the extracted command;
    a nonvolatile memory to be accessed by the processing circuit; and
    a modulation circuit that generates a response signal based on result of a process corresponding to the command, wherein the reception circuit, the processing circuit, the nonvolatile memory, and the modulation circuit are driven by the power supply voltage generated by the rectification circuit.

4. The semiconductor device according to claim 2, wherein the first diodes of the rectification circuit comprise schottky barrier diodes.

5. The semiconductor device according to claim 4, further comprising:
    a reception circuit that extracts a command from the wireless signal received by the antenna;
    a processing circuit that performs a process corresponding to the extracted command;
    a nonvolatile memory to be accessed by the processing circuit; and
    a modulation circuit that generates a response signal based on a result of a process corresponding to the command, wherein the reception circuit, the processing circuit, the nonvolatile memory, and the modulation circuit are driven by the power supply voltage generated by the rectification circuit.

6. The semiconductor device according to claim 1, further comprising:
    a reception circuit that extracts a command from the wireless signal received by the antenna;
    a processing circuit that performs a process corresponding to the extracted command;
    a nonvolatile memory to be accessed by the processing circuit; and
    a modulation circuit that generates a response signal based on a result of a process corresponding to the command, wherein the reception circuit, the processing circuit, the nonvolatile memory, and the modulation circuit are driven by the power supply voltage generated by the rectification circuit.

* * * * *